(12) United States Patent
Gaveau

(10) Patent No.: US 9,849,945 B2
(45) Date of Patent: Dec. 26, 2017

(54) FLOATING SUPPORT DEVICE FOR A PHOTOVOLTAIC PANEL

(71) Applicant: CIEL ET TERRE INTERNATIONAL, Hellemmes (FR)

(72) Inventor: Alexis Gaveau, Villeneuve d'ascq (FR)

(73) Assignee: CIEL ET TERRE INTERNATIONAL, Hellemmes (FR)

( * ) Notice: Subject to any disclaimer, the term of this patent is extended or adjusted under 35 U.S.C. 154(b) by 0 days.

(21) Appl. No.: 15/104,831

(22) PCT Filed: Dec. 12, 2014

(86) PCT No.: PCT/FR2014/053323
§ 371 (c)(1),
(2) Date: Jun. 15, 2016

(87) PCT Pub. No.: WO2015/092237
PCT Pub. Date: Jun. 25, 2015

(65) Prior Publication Data
US 2016/0368577 A1    Dec. 22, 2016

(30) Foreign Application Priority Data

Dec. 16, 2013 (FR) ..................................... 13 62700

(51) Int. Cl.
*B63B 35/44* (2006.01)
*F24J 2/52* (2006.01)
*B63B 35/38* (2006.01)

(52) U.S. Cl.
CPC .............. *B63B 35/44* (2013.01); *B63B 35/38* (2013.01); *F24J 2/5237* (2013.01); *F24J 2/5269* (2013.01);
(Continued)

(58) Field of Classification Search
CPC ..... H01L 31/0422; H01L 31/02; H01L 31/04; B63B 7/00; B63B 35/00; B63B 35/44;
(Continued)

(56) References Cited

U.S. PATENT DOCUMENTS

2007/0234945 A1\* 10/2007 Khouri ................. H01L 31/042
114/266
2008/0029148 A1    2/2008 Thompson
(Continued)

FOREIGN PATENT DOCUMENTS

DE    10 2012 100 759 A1    8/2013
JP    H8-167729 A    6/1996
(Continued)

OTHER PUBLICATIONS

International Search Report, dated Feb. 10, 2015, from corresponding PCT Application.

*Primary Examiner* — Lars A Olson
(74) *Attorney, Agent, or Firm* — Young & Thompson

(57) ABSTRACT

A floating support device (1) for a photovoltaic panel, includes: a structure (2) including coupling elements (3) for coupling to other floating devices in such a way as to allow a network (R) of floating devices to be formed; one or a plurality of floats (4), intended to ensure that the device does float, which are rigidly connected to the structure (2); and elements for holding at least one photovoltaic panel (P), and in which the structure is an element separate from the float(s) so as to allow forces to be transmitted between the floating devices of the network without transmitting the forces from the network to the float(s).

48 Claims, 12 Drawing Sheets

(52) U.S. Cl.
CPC ....... *B63B 2035/4453* (2013.01); *Y02B 10/20* (2013.01); *Y02E 10/47* (2013.01)

(58) Field of Classification Search
CPC ......... B63B 39/03; B63B 35/34; B63B 38/00; H02S 10/40
USPC .......................... 114/267, 264; 136/244, 251
See application file for complete search history.

(56) References Cited

U.S. PATENT DOCUMENTS

| | | |
|---|---|---|
| 2014/0224165 A1 | 8/2014 | Veloso et al. |
| 2015/0075587 A1 | 3/2015 | Veloso et al. |

FOREIGN PATENT DOCUMENTS

| | | |
|---|---|---|
| JP | 2001-189486 A | 7/2001 |
| WO | 2010/064105 A2 | 6/2010 |
| WO | 2011/094803 A1 | 8/2011 |
| WO | 2012/139998 A2 | 10/2012 |
| WO | 2013/116897 A1 | 8/2013 |
| WO | 2013/153329 A1 | 10/2013 |

\* cited by examiner

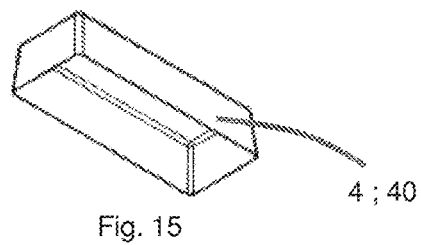
Fig. 15    4 ; 40
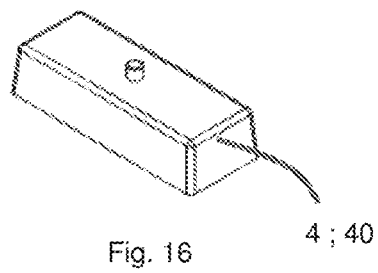
Fig. 16    4 ; 40
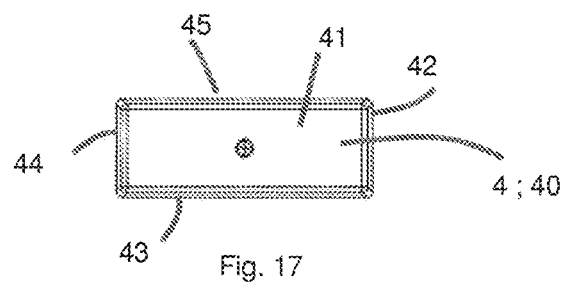
Fig. 17    45  41  42  44  43  4 ; 40
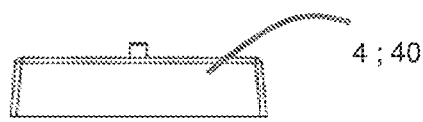
Fig. 18    4 ; 40
Fig. 19    4 ; 40

FLOATING SUPPORT DEVICE FOR A PHOTOVOLTAIC PANEL

The invention relates to a floating support device for a photovoltaic panel or panels, as well as a floating system resulting from the assembly of floating devices.

The field of the invention is that of floating photovoltaic installations, and more particularly floating photovoltaic installations resulting from the assembly of floating devices, support for panel or panels, of modular design.

Such modular devices can be rapidly assembled on site, by aligning the photovoltaic panels of the same row, and very often by constituting several rows of photovoltaic panels.

It is known in prior art, for example, from document US 2008/0029148 A1 an installation resulting from the assembly of floating support devices for panels, of modular design.

Each modular floating device, such as shown in FIG. 1 from this anteriority, comprises two cylindrical elongated floats, as well as a self-bearing structure resulting from the assembly of tubes welded together.

Four tubes of the structure extend longitudinally, respectively, in the extension of the ends of the floats, with the terminal ends of these tubes being provided with end rings.

The assembly of the floating photovoltaic installation is obtained, according to the direction of the elongated floats, by the direct coupling of the end rings of a floating device with the end rings of an adjacent modular device.

The floating device comprises four other additional lateral coupling rings, in order to provide for the assembly of neighbouring floating devices, according to the perpendicular direction.

The assembly of the floating photovoltaic installation is obtained, according to the direction perpendicular to the elongated floats, by the coupling of the lateral rings of a floating device to the lateral rings of an adjacent modular device, by the intermediary of connection parts.

This structure allows for the support of two photovoltaic panels, mounted rotatingly with respect to the structure.

The manufacture of such modular devices, disclosed by this anteriority, requires the carrying out of a structure resulting from the assembly of tubes, typically mechanically welded. According to the observations of the inventor, such a design is not economically interesting, because of its excessively high cost of manufacture.

Those skilled in the art also know from document WO2012/139998 an installation resulting from the assembly of floating support devices for panels, of modular design and of connection elements, which themselves are in the form of floats. The support devices and the connection elements are intended to be assembled in order to form a network of floats.

According to this modular design, each modular support device for a panel is substantially constituted of a plastic envelope which bears several functions and, in particular:
 a float function: the plastic envelope encloses in a sealed manner a volume of air which makes it possible to ensure that the device does float,
 possibly, an element function for inclining the two photovoltaic panels: its upper wall is inclined with respect to its lower wall in such a way as to ensure the inclination of the photovoltaic panel with respect to the body of water, and
 a structure element function: the plastic envelope constitutes the structure through which the forces of the network of floats transit.

The multifunction plastic envelope of this modular device is typically obtained by rotomoulding or by blowing extrusion, of a single piece, which reduces the costs with respect to the mechanically-welded structure of the device of document US 2008/0029148 A1.

Those skilled in the art further know, from document WO2011/094803, an installation resulting from the assembly of floating support devices for panels, of modular design, assembled directly between them in order to constitute a network of floats.

According to this modular design, each device comprises a float, which seems to be constituted by an envelope, and supports that make it possible to incline the two photovoltaic panels with respect to the float.

The envelope forms coupling elements, marked 16 to 22 which allows for the assembly between them of floats.

The envelope bears several functions, namely:
 a float function and,
 an intermediate structure function: the envelope constitutes the structure through which the forces of the network of floats transit.

The function of inclining the panel with respect to the surface of the water is ensured by elements separate from the floats.

In documents WO2012/139998 or WO2011/094803, the envelope has to be sufficiently resistant in order to withstand the forces of the network. According to the observations of the inventor, it is necessary, in practice, to increase the resistance of this element by providing a wall thickness greater than what would be necessary to ensure only the function of a float.

The blowing extrusion of a plastic envelope, of complex shape, such as disclosed by document WO2012/139998 can be carried out and has been manufactured by the applicant. However, it requires substantial know-how from the extruding manufacturer, in order to obtain a wall thickness that is relatively uniform over the entire surface of the envelope, while limiting the consumption of plastic.

According to the observations of the inventor, another disadvantage of the devices of documents WO2012/139998 and WO2011/094803 is that of transporting on the installation site of its constituting elements, and in particular the float elements, semi-rigid or rigid parts, which are substantially bulky.

The purpose of this invention is to propose a support device for a panel, of modular design, with controlled manufacturing cost and simplified manufacture.

Another purpose of this invention is to propose a system resulting from the assembly of devices in accordance with the invention, and possibly of connection elements which themselves float.

Another purpose of this invention is to proposer, at least according to one embodiment, such a support device, or to propose a piece of equipment for the carrying out of which the design makes it possible to facilitate their transport to the installation site, and in particular to facilitate the transport of the floats to the site.

Other purposes and advantages shall appear in the description which is provided solely for the purposes of information and which does not have for purpose to limit it.

The invention first relates to a floating support device for a photovoltaic panel, comprising:
 a structure comprising coupling elements for coupling to other floating devices in such a way as to allow for the formation of a network of floating devices,
 one or several floats, intended to ensure that the device does float, rigidly connected to said structure, elements for holding at least one photovoltaic panel, and wherein said structure is an element separate from the float or floats in such a way as to allow for the transmission of forces between the floating devices of the network, without transmitting the forces of the network to said float or floats.

The support device, according to the invention, has a particular application as a modular element.

According to the invention, the function of a float, on the one hand, and the structure function allowing for the transmission of the forces of the network, on the other hand, are provided by disassociated elements, namely the floats and said structure.

In the invention, the element function that allows for the transmission of the forces of the network is borne solely by said structure in such a way that the float or floats, on the one hand, and also said at least one photovoltaic panel borne by this device, on the other hand, are isolated from the forces of the network.

It is as such possible to dimension the or each one of the floats, preferably, made of plastic, formed by an envelope with a relatively low wall thickness, for example, less than or equal to 2 mm.

Said structure intended to ensure the transmission of the forces of the network can be a plastic element, for example of a single piece. This structure can be manufactured by moulding, in particular injection moulding, or other methods for transforming plastic. As this structure has to withstand the forces of the network, the thickness of the wall can be greater than or equal to 3 mm, preferably greater than 10 mm, at least on the coupling elements.

According to an embodiment, the plastic element of the structure is a hollow, preferably sealed, body. Alternatively or additionally, the plastic element is a perforated element, for example latticed. Such a design of the element as hollow and/perforated, makes it possible to limit the consumption of plastic and therefore to limit the cost of the device, and even to rigidify it.

According to another embodiment, said structure results from the assembly of several elements, preferably in a removable manner. Said elements are preferably assembled by a screwing system, a snap-fit system, or a strap system or any other system that allows for a rapid assembly of the elements in order to carry out said structure.

According to an embodiment, the structure and the float or floats are rigidly connected together by a screwing system, a strap system, or a snap-fit system. Fastening systems provide a rapid assembly, in a removable manner, and preferably without tools between the structure and the float or floats are favoured.

According to an embodiment, said coupling elements for coupling to other floating devices can be protruding lugs, preferably substantially horizontal. In the case where said structure results from the assembly of several elements, these lugs can accumulate, in addition to the function as elements for the assembly of the support device to other floating devices, a function as an element for the assembly of all or a portion of the elements of the structure.

To this effect all or a portion of said elements of said structure comprise said lugs, with all or a portion of the elements being assembled together by the intermediary of facing lugs, belonging to at least two separate elements of said elements of the structure, and by the intermediary of a locking member, such as a bolt, passing through said lugs.

According to optional characteristics of the invention, taken individually or in combination:

the structure is provided as overhanging, laterally, with respect to the said float or floats and preferably in a continuous manner on the periphery of said float or floats;

the device has one or several support elements for inclining said at least one photovoltaic panel with respect to the surface of the water, for example of inclination between 10° and 30°, the or each one of the floats is constituted of a plastic envelope, enclosing a volume of air, or alternatively, the or each one of the floats is an inflatable element.

According to yet another embodiment, the or each one of the floats comprises a sealed semi-open body, as a truncated cone or alternatively as a frustum pyramid, rigidly connected to the structure in such a way as to form a pocket opened downwards, trapping a volume of air. Such an embodiment substantially facilitates the transport of the floats of which the semi-opened bodies, of tapered shape or as a frustum pyramid can be advantageously stacked into one another, during transport, and be assembled to their structure only in a second step, for example directly on the installation site.

According to an embodiment, the float or floats are rigidly connected to the structure, bearing on the under-face of said structure, in particular by means of a fastening system of the removable type (screw/nut system, reversible clips, strap).

According to an advantageous embodiment, the support device is designed to hold a single photovoltaic panel, said elements for holding being arranged in such a way as to allow for the mounting of the photovoltaic panel overhanging laterally, in particular on the two sides of said device.

Such a design participates, again, in decreasing the consumption of material in particular of plastic, required to manufacture the device, and as such in limiting its cost.

The invention also relates to a piece of equipment for the carrying out of a photovoltaic installation comprising a plurality of said modular support devices for a panel, in accordance with the invention.

The modular support devices for a panel of the equipment are intended to be assembled together in order to form a network of floating devices, either directly by assembling their coupling elements, or indirectly by the intermediary of their coupling elements and intermediate connection elements, According to optional characteristics of the equipment, taken individually or in combination:

the equipment further comprises floating modular connection elements, said equipment having coupling elements distributed between said connection elements and said support devices that allows for the assembly between them of said connection elements and of said support devices;

each floating connection element is in the form of a plastic envelope that has an interior volume making it possible to ensure that said connection element does float, said plastic envelope having said coupling elements, or alternatively;

each connection element comprises, on the one hand, a structure comprising said coupling elements for coupling to other floating devices in such a way as to allow for the forming of a network of floating devices and on the other hand, one or several floats, intended to ensure that the device does float, rigidly connected to said structure: said structure is then an element separate from said float or floats in such a way as to allow for the transmission of forces between the floating devices of the network, without transmitting the forces of the network to said float or floats;

the said coupling elements are protruding lugs, said equipment comprising locking members such as pins or bolts, with each locking member being intended to pass through several lugs placed facing in order to ensure the locking of the assembly.

The invention also relates to a system resulting from the assembly of support devices of the equipment in accordance with the invention, directly by the intermediary of their coupling elements, or indirectly by the intermediary of their coupling elements and of inserted connection elements obtaining a network of floating devices.

According to an embodiment, said system comprises said connection elements, said system having at least two rows of support devices for panels in accordance with the invention, said two rows being held by means of a row of inserted connection elements: this row of connection elements possibly makes it possible to constitute a corridor for maintenance, continuous or discontinuous.

According to an embodiment, two consecutive support devices belonging to the same row are separated mutually by means of a connection element, even two connection elements in parallel, bracing said consecutive devices.

Alternatively or additionally, according to an embodiment, two consecutive support devices belonging to the same row can be separate, mutually, by means of a support device of an adjacent row, bracing the two consecutive devices.

Such a configuration of the network of devices makes it possible to hold two consecutive support devices for panels separated and distant. This allows advantageously for the mounting of the overhanging panel with respect to the device, according to the direction of said row.

According to yet another embodiment, the structures of said support devices can be of an overabundant dimension with respect to the dimensions of the photovoltaic panels borne by the structures, configured in such a way that the overabundant portions of the structures belonging to the same row of devices supports of the network form an alley for maintenance for the operators.

The invention shall be better understood from the description accompanied by annexed figures among which:

Figure 4:
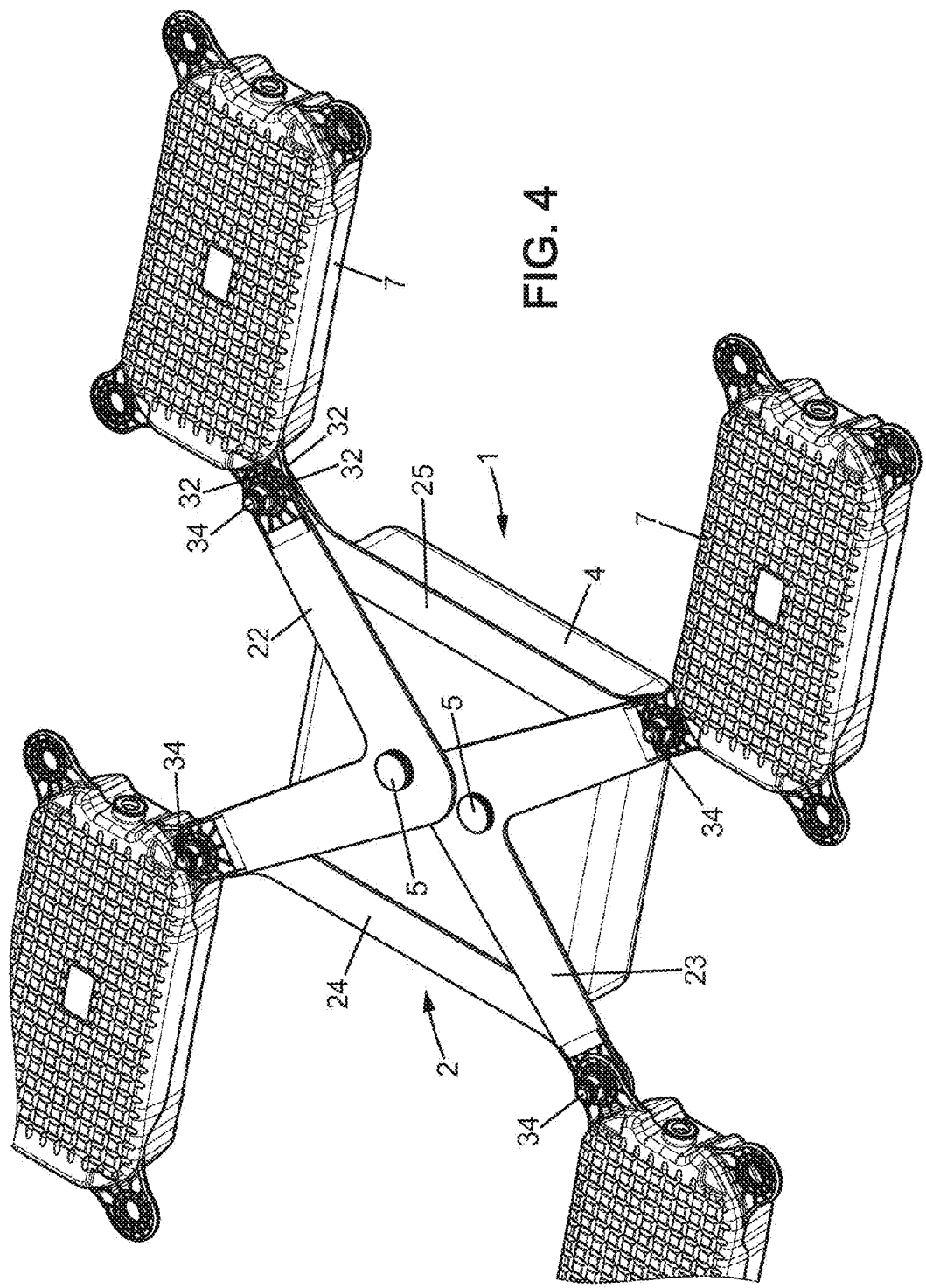
Figure 5:
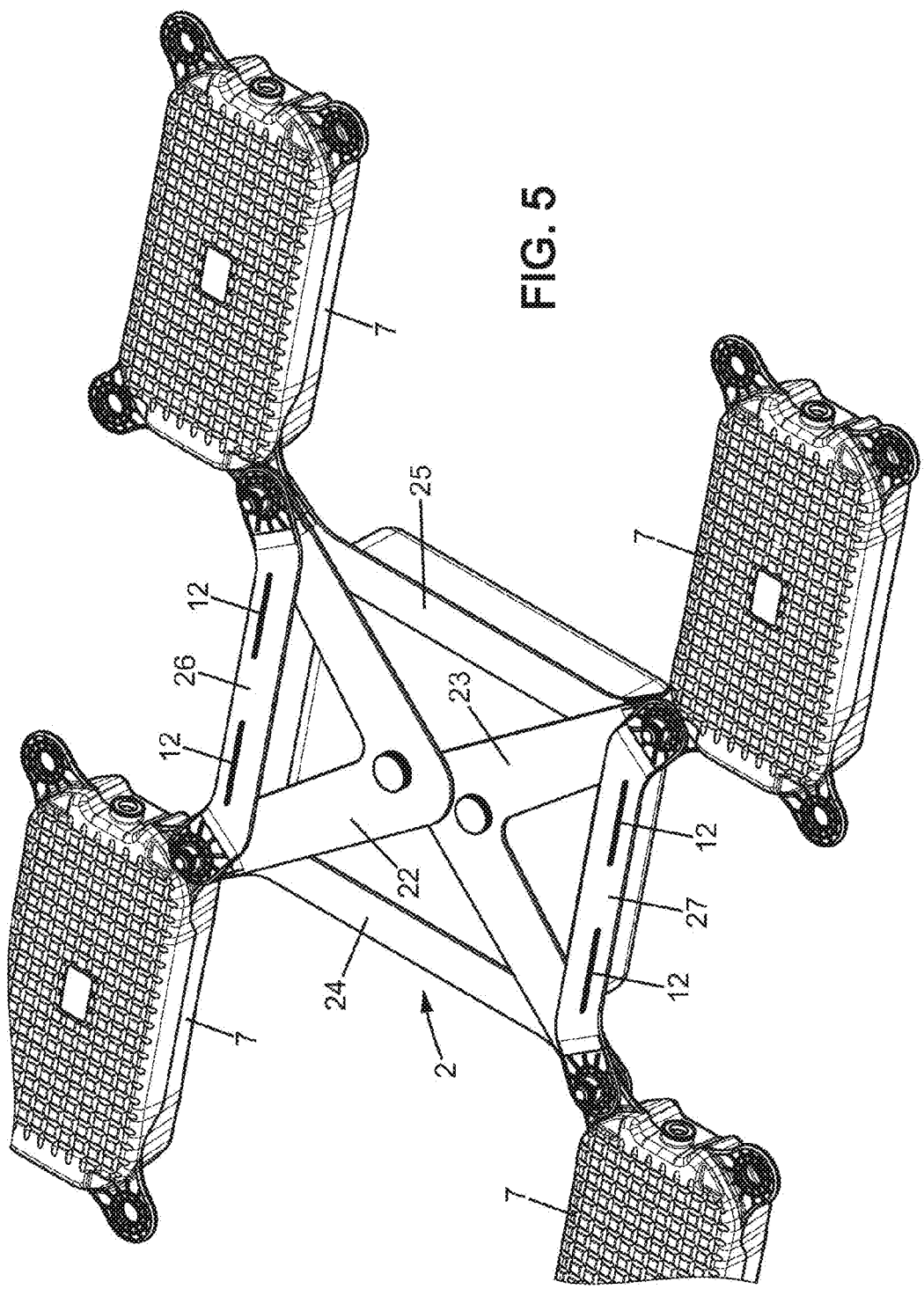
Figure 6:
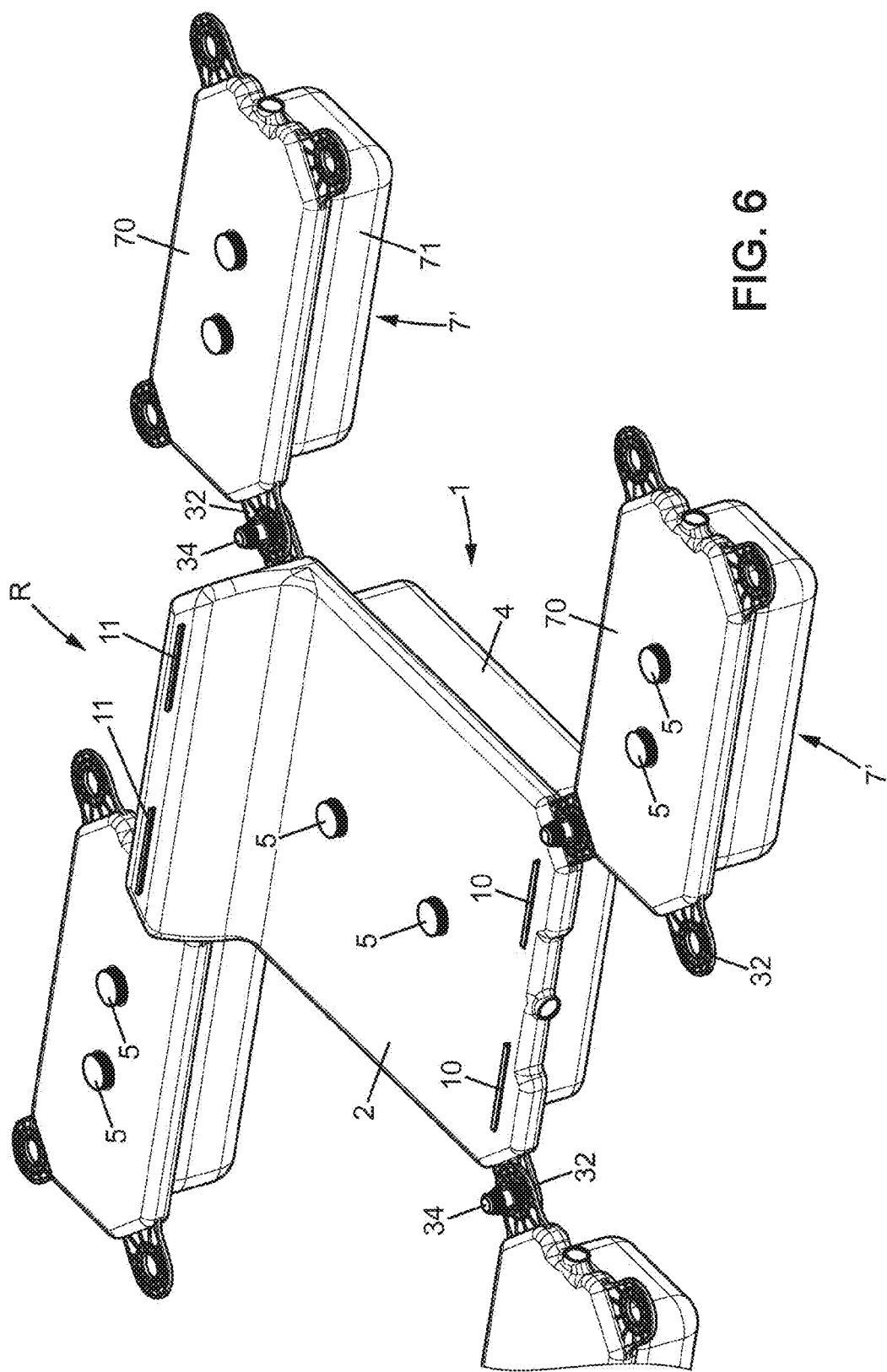
Figure 7:
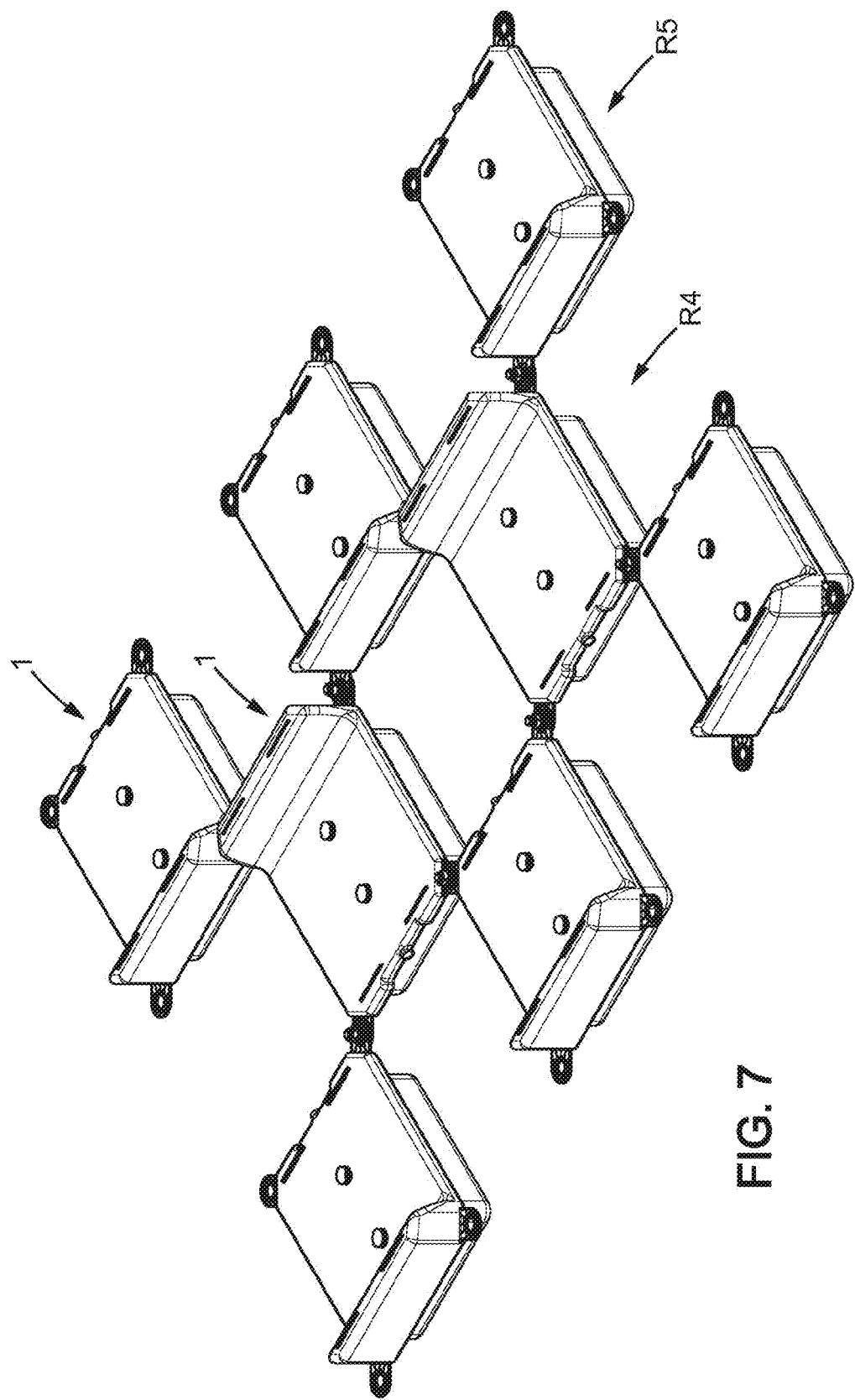
Figure 8:
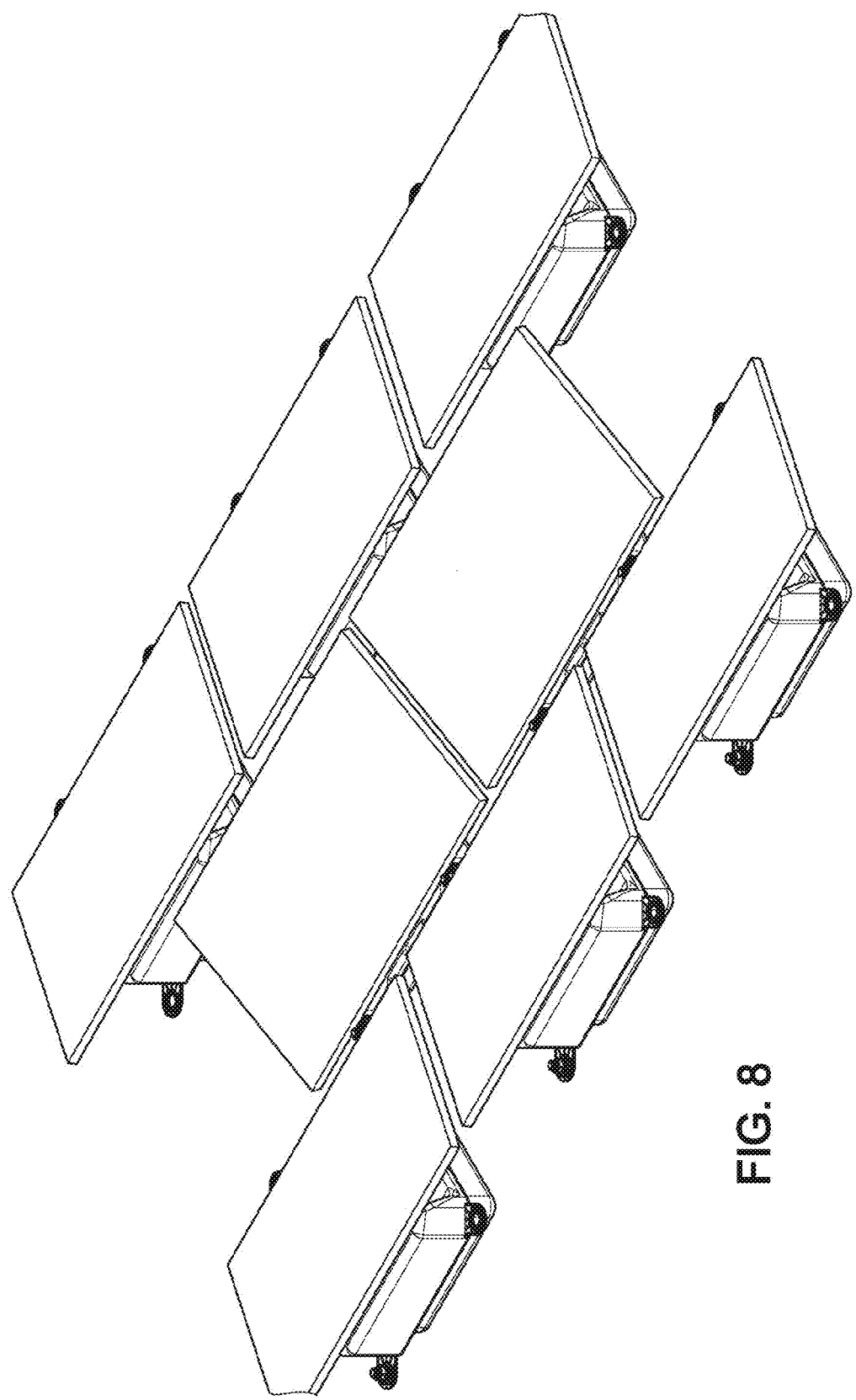
Figure 9:
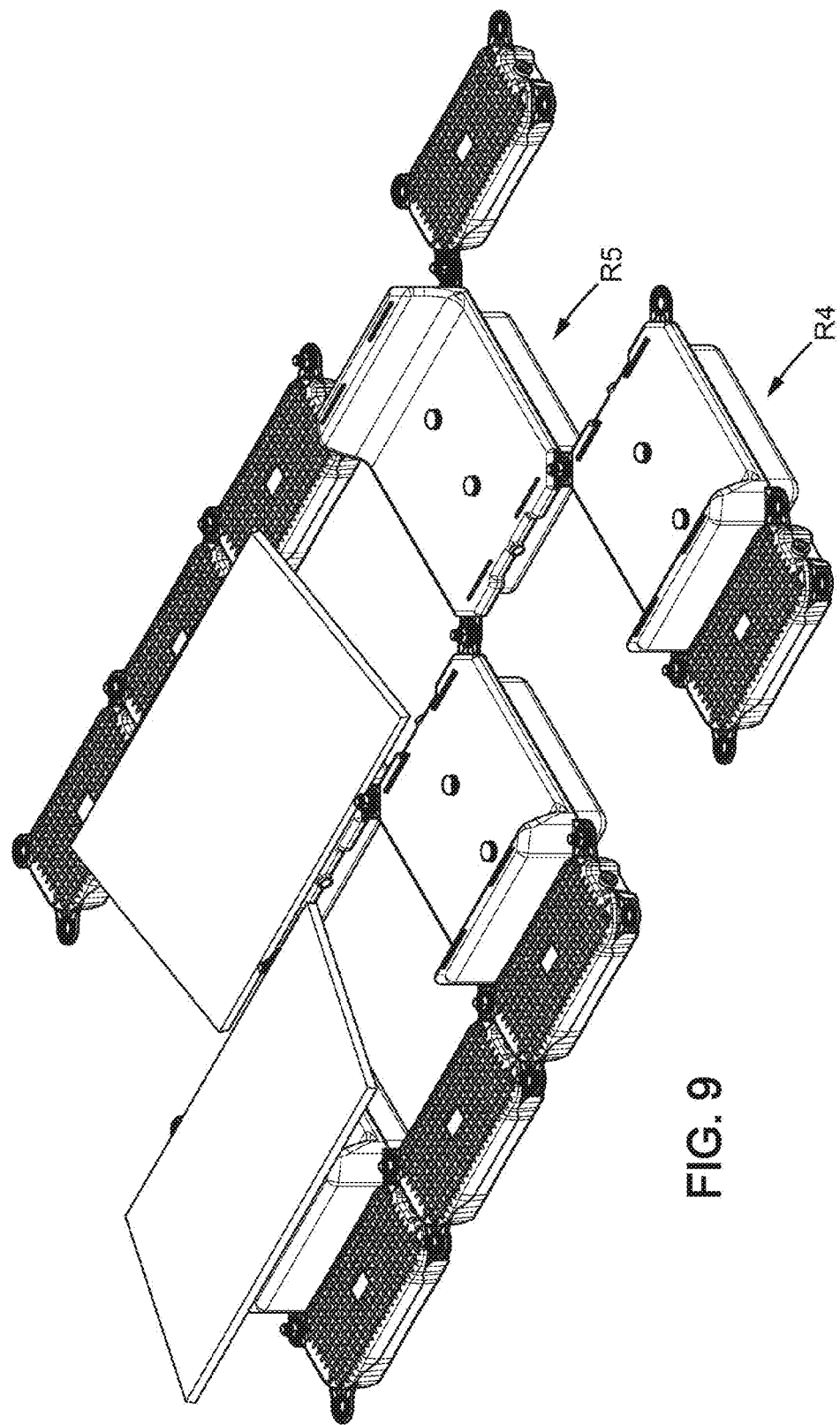
Figure 10:
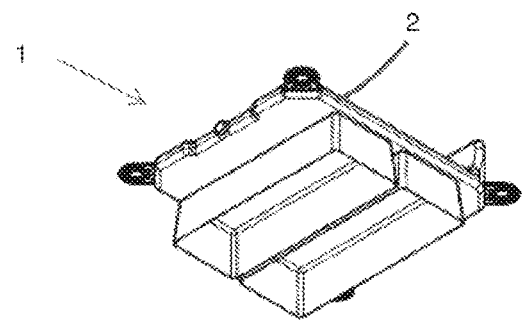
Figure 12:
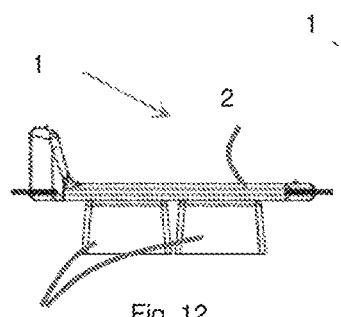
Figure 11:
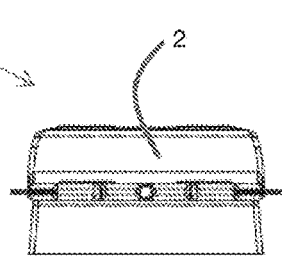
Figure 13:
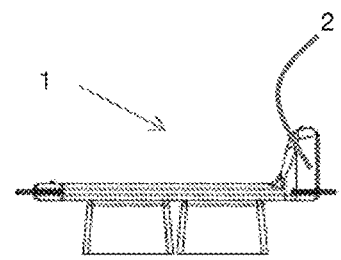
Figure 14:
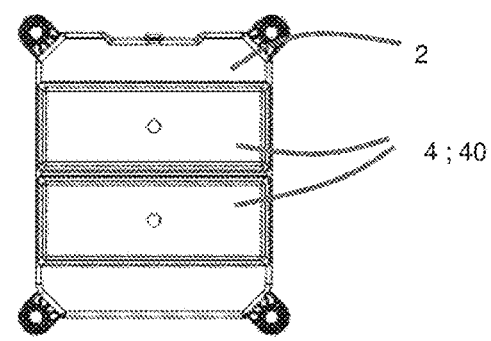

FIG. 4 shows a third embodiment of the invention for which the structure of the device results from the assembly of several elements, FIG. 5 is an alternative of the embodiment in FIG. 4, FIG. 6 shows a fourth embodiment for which each connection element comprises, on the one hand, a structure bearing the coupling elements (i.e. lugs) and, on the other hand, a float that ensures that said connection element does float, FIG. 7 shows a system in accordance with the invention according to an embodiment, resulting from the assembly of support devices in accordance with the invention, directly by the intermediary of their coupling elements (panels not shown), FIG. 8 is a view of the system of FIG. 7, with the photovoltaic panels being shown, FIG. 9 shows yet another embodiment of the system in accordance with the invention, FIGS. 10 to 14 respectively show perspective, from, side (left and right) and bottom views, of a fifth embodiment of the device in accordance with the invention of floats with a design that can be stacked, FIGS. 15 to 19 are views, respectively, perspective from underneath, perspective from above, front and side, with a float with an open and stackable design, and used in a device according to FIGS. 10 to 14, FIGS. 20 and 21 are partial diagrammatical views (floats not shown) in perspective of a system in accordance with the invention according to another embodiment, respectively with and without photovoltaic panels, and wherein said structure of the devices are of overabundant dimensions with respect to the photovoltaic panels, in such a way as to create an alley for maintenance.

Also, the invention relates to a floating support device 1 for a photovoltaic panel, comprising:

a structure 2 comprising coupling elements 3 for coupling to other floating devices in such a way as to allow for the formation of a network R of floating devices, one or several floats 4, intended to ensure that the device floats, rigidly connected to said structure 2, elements for holding at least one photovoltaic panel P.

According to the invention, said structure 2 is an element separate from said float or floats 4 in such a way as to allow for the transmission of forces between the floating devices 1, 7 (or 1, 7') of the network R, without transmitting the forces of the network R to said float or floats 4. This support device 1 has a particular application as a modular element.

According to the invention, the function of a float, on the one hand, and the structure function allowing the transmission of the forces of the network, according to the two directions of the network R, are provided by disassociated elements.

It is as such possible to dimension the float or floats 4, preferably, made of plastic with a low thickness of material. The or each one of the floats 4 can be formed by a plastic envelope with a relatively low wall thickness, for example, less than or equal to 2 mm. The semi-rigid float or floats can be obtained by blowing extrusion, rotomoulding or other. Each float comprises a sealed envelope, enclosing a volume of air. Such a float solution shown in FIGS. 1 to 9 however has for a disadvantage a substantial space of the floats, which does not facilitate their transport on the site. According to another alternative (not shown) the or each one of the floats can be an inflatable element. In this case, the float comprises at least partially a flexible envelope intended to contain a volume of air in a sealed manner. This inflatable element has the advantage of being able to be transported in deflated state, in particular flat, in a position of least space. It can then be inflated and/or formed only on the installation site in such a way as to enclose a volume of air proving the floating.

According to yet another embodiment shown in FIGS. 10 to 19, the or each one of the floats 4 comprises a sealed semi-open body 40, rigidly connected to the structure in such a way as to form a pocket opened downwards, trapping a volume of air. Such a semi-open body can be made of plastic material, obtained for example par thermoforming.

Such an embodiment substantially facilitates the transport of the floats of which the semi-opened bodies 40, of tapered shape (not shown) or as a frustum pyramid (shown) can be advantageously stacked into one another, during transport, and be assembled to their structure only in a second step, for example directly on the installation site.

The semi-open body can be of circular shape (thus as a truncated cone) or polygonal in particular rectangular (as a frustum pyramid) such as shown as an example in FIGS. 15 to 19. In the case of a frustum of pyramid, the semi-open body can as such comprise a polygonal upper wall 41, in particular substantially rectangular, as well as lateral walls 42 to 45 in particular in the number of four, forming the walls of the pyramid. In the case of a semi-open body of tapered shape, the upper wall is of circular shape, namely a disc, and the lateral wall forms the truncated cone.

In both cases, whether the semi-open body is a truncated cone or a frustum of pyramid, it is opened downwards, i.e. devoid of a lower wall in such a way that this semi-open body can be stacked with one, or preferably several identical semi-open bodies of the same type.

When placed on the water, special attention is given to the inclination of the devices in order to trap the air in the open volume of the floats, by retaining a certain horizontality of the devices 1.

Said structure 2 intended to ensure the transmission of the forces of the network, having said coupling elements, can be an element in particular made of plastic, preferably of a single piece. Such an embodiment is shown, as a non-limiting example, for the embodiments of FIGS. 1 to 3 and 6.

This structure can be manufactured by moulding, in particular rotomoulding, blowing extrusion or other methods for transforming plastic. As this structure has to withstand the forces of the network, the thickness of the wall can be greater than or equal to 3 mm and preferably greater than or equal to 10 mm at least on the coupling elements 3.

Figure 2:
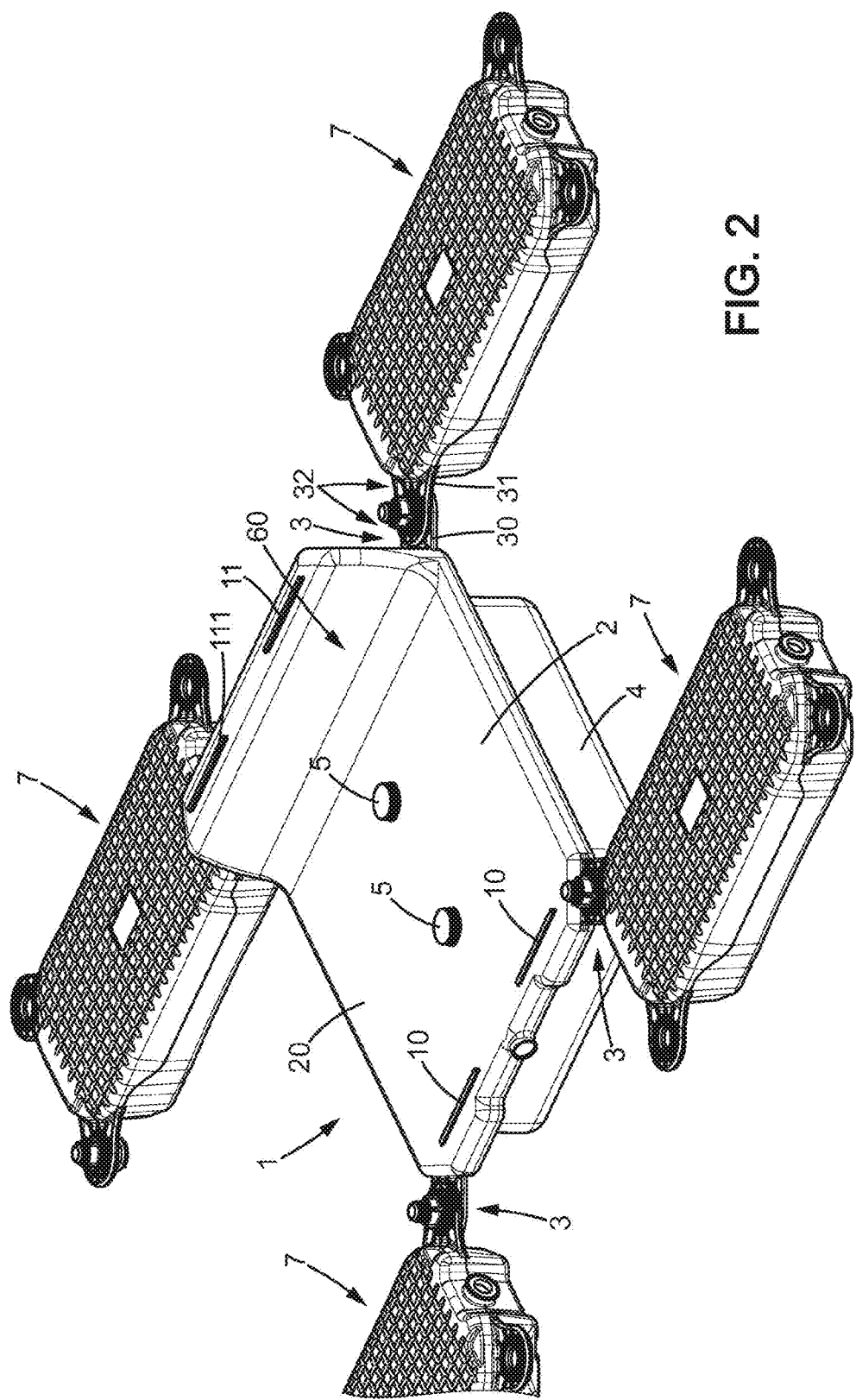
FIG. 2 is a detailed view of FIG. 1.

In order to limit the consumption of material, said structure can be a hollow body 20, for example such as shown in a non-limiting manner in FIG. 2. Alternatively or additionally, the plastic element can be a perforated body 21, for example latticed, for example such as shown in a non-limiting manner in FIG. 3.

According to an embodiment, said coupling elements 3 can be protruding lugs 32. The coupling elements 3, in particular said lugs 32 can be provided at the four corners of the structure 2.

The structure 2 can be, seen from above, of a substantially rectangular shape such as shown in the figures. The float or floats 4 are subject to the lower portion of the structure 2 by any suitable means, preferably bearing on the under-face of said structure.

However, fastening systems that allow for a rapid assembly of the structure with the float or floats, preferably in a removable manner, and preferably without tools, are favoured. These system scan be chosen from a screwing system 5, a strap system, or a snap-fit system. According to the examples shown, two screws 5 of the screwing system pass through two bores of the structure 2 and engage with the tappings of the float 4. According to an embodiment, the structure and the float or floats can be rigidly connected by another other technique, such as gluing, welding, etc.

Alternatively, and according to an embodiment shown in a non-limiting manner in FIGS. 4 and 5, said structure 2 resulting from the assembly of several elements 22, 23, 24, 25, 26, 27. These elements 22, 23, 24, 25, 26, 27 can be made of plastic, for example obtained via moulding, in particular injection moulding.

Said elements 22, 23, 24, 25 can be assembled by a screwing system, a snap-fit system, or a strap system or any other system allowing for rapid assembly on site.

The embodiments in FIGS. 4 and 5 use a screwing system (bolts 34) in order to allow for the assembly of the elements 22, 23, 24 and 25, and even 26 and 27 of the structure 2.

According to this advantageous embodiment, locking elements 34 such as bolts allow not only for the assembly of the elements 22, 23, 24, 25, and even 26, 27 of the structure 2, but also cooperate with the lugs 32 of neighbouring floating devices in order to ensure the coupling of the support device 1 with the neighbouring floating devices of the network R.

Generally, all or a portion of said elements 22, 23, 24, 25 of said structure 2 can comprise said lugs 3, with all or a portion of the elements 22, 23, 24, 25 being assembled together by the intermediary of facing lugs 32, belonging to at least two, separate, from said elements 22, 25; 23, 25; 23, 24; 22, 24, and by the intermediary of a locking member 34, such as a bolt, passing through said lugs 32.

More particularly, the structure 2 of the embodiment in FIG. 4 comprises four elements 22, 23, 24, 25. The four elements 22, 23, 24, 25 each comprise two lugs 32. The elements are assembled together, two by two, by placing facing two of the lugs 32 belonging to two separate elements 22, 25; 23, 25; 23, 24; 22, 24 and by the setting in place of the locking member 34, such as a bolt 34, passing through the two lugs 32.

According to the embodiment shown, the elements 22 and 23 are in the shape of a V, seen from above, arranged head to tail in such a way as to form an X and are respectively fixed to the float 4, in particular by screwing, on their median portion. The ends of the V are provided respectively with said lugs 32.

The two other elements 24 and 25 are slender items each provided with lugs 32 at their ends. Each element 24 or 25 connects the two elements in the shape of a V, 22 and 23, with the two lugs of each element 24 and 25 being placed facing respectively with two lugs 32 belonging to the elements 22 and 23 and connected to the latter by means of locking members 34 such as bolts. This same locking member 34 passes through and holds a lug 32 of a neighbouring floating device, marked 7. The elements for assembling of the structure 2 extend preferably, according to a plane above the float or floats.

According to an embodiment, the float 4 can be a single float, in particular of parallelepiped shape. The structure 2 is then subject preferably on the upper face of this float.

According to an embodiment, the structure 2 is provided overhanging, laterally, with respect to said float or floats 2.

Providing the structure 2 protruding, laterally with respect to said float or floats makes it possible to protect the float or floats in the case of collision. For example in the figures, the structure 2 overhangs laterally, and preferably in a continuous manner over the periphery of the float, of the four sides of the float 4, and not only on the coupling elements, in particular lugs.

According to an embodiment, said device has one or several support elements 60, 61 in order to incline said at least one photovoltaic panel P with respect to the surface of the water. This element makes it possible to incline the two photovoltaic panels with respect to the body of water, in particular by an angle between 10° and 30°

This support element 60 can comprise, or be constituted by said element forming said structure 2, or further comprise or be constituted by one or several separate elements.

Figure 1:
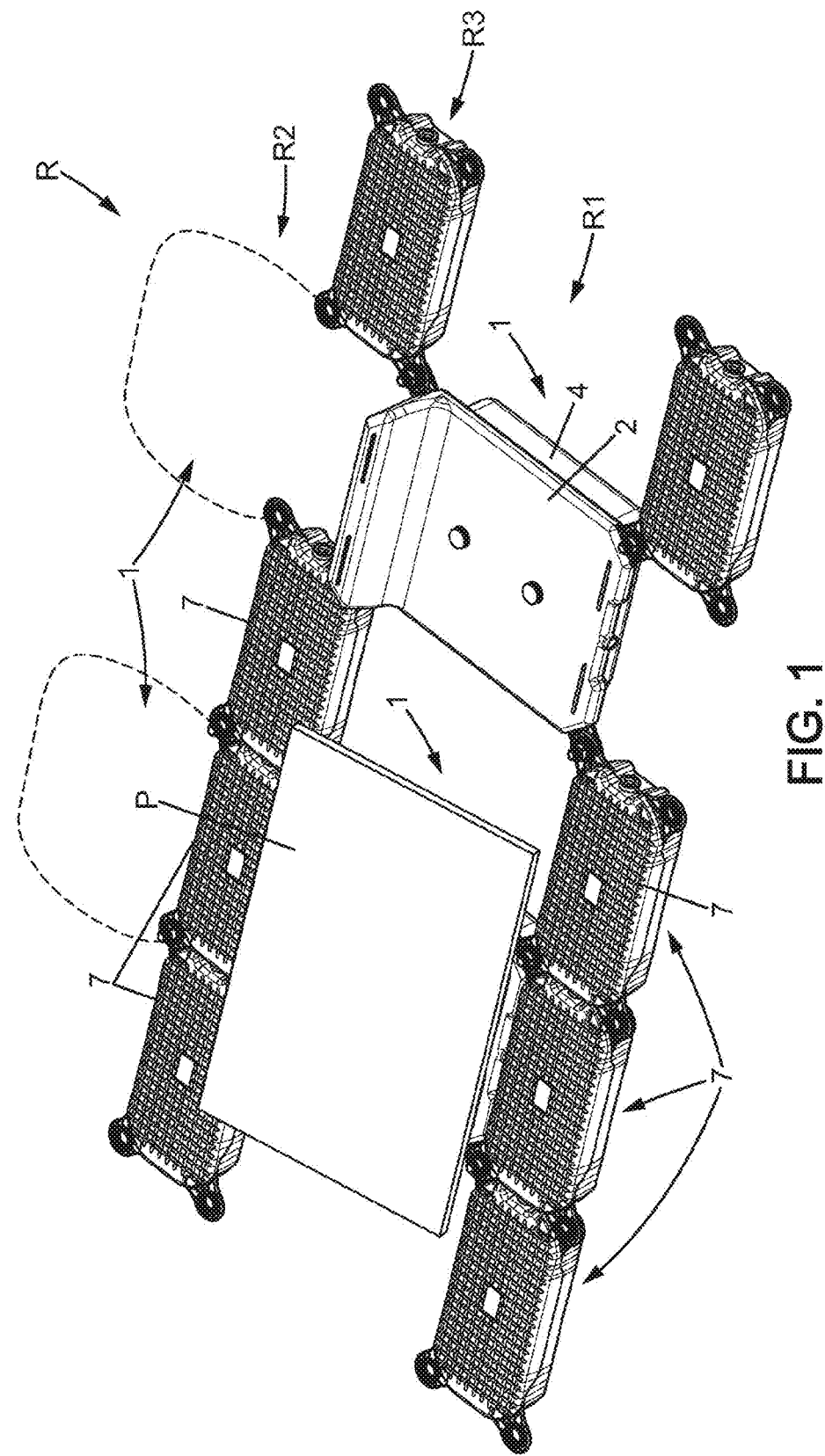
FIG. 1 shows a system resulting from the assembly of support devices for panels according to the invention and of connection elements.

For example, according to the embodiment in FIGS. 1 and 2, said structure 2, formed by an element made of plastic of a single piece, has at least one bottom fastening rib 10, and at least one top fastening rib 11, at a higher level, that will allow for the inclination of the photovoltaic panel P.

Figure 3:
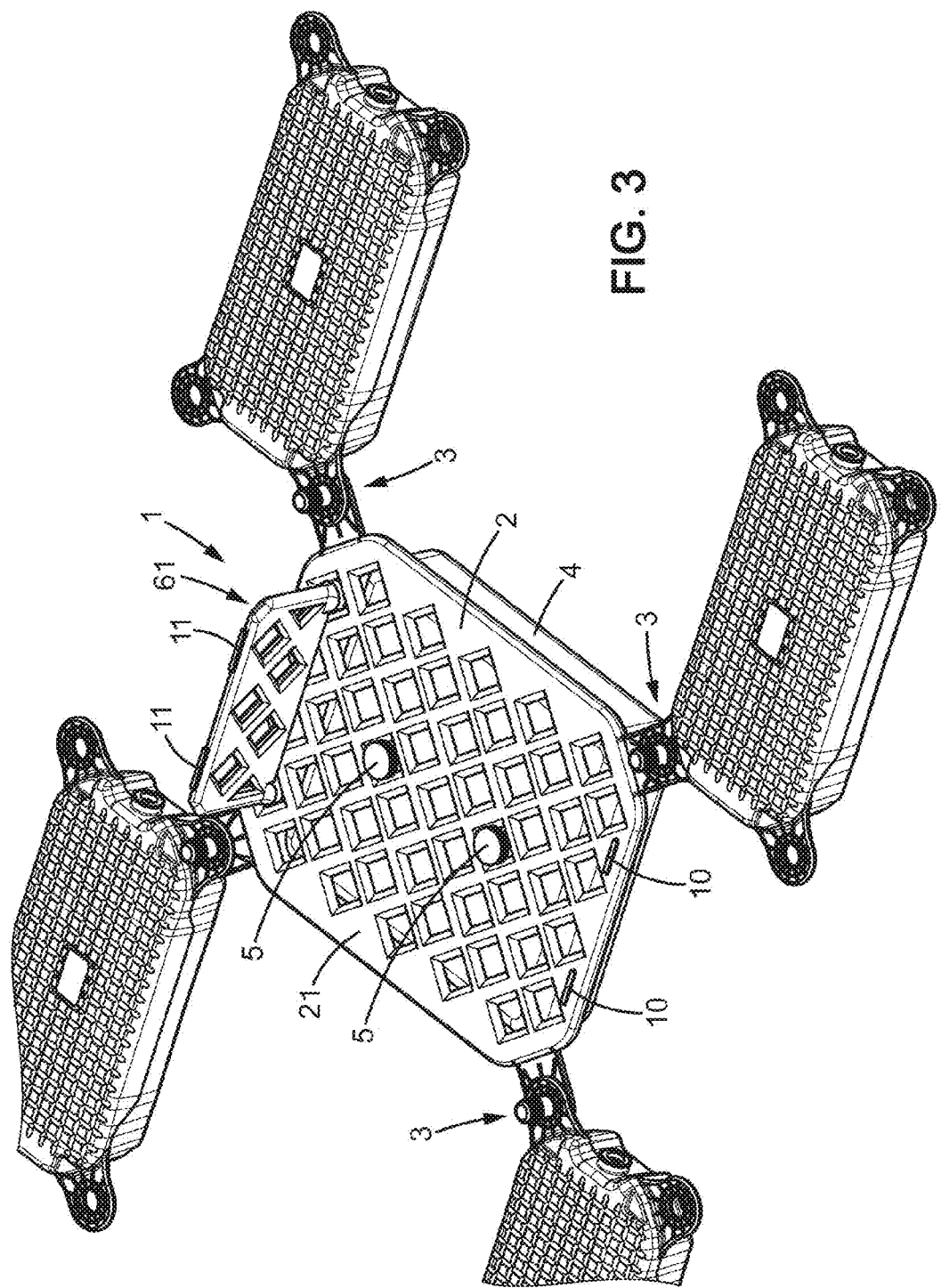
FIG. 3 shows a second embodiment of the invention.

According to another embodiment shown in FIG. 3 the structure 2 has at least one bottom fastening rib 10. At least one top fastening rib 11 is provided on a support element 61, separate from the structure 2, at a higher level. These ribs 10 and 11 allow for the inclination of the photovoltaic panel P.

These fastening ribs 10, 11 allow for the setting in place of elements for holding the fastening device of the photovoltaic panel, disclosed by document WO2013/153329, of this applicant by threading said ribs 10 and 11, respectively, into the additional fastening grooves of said elements for holding. The element for holding threaded onto the bottom rib 10 makes it possible to hold the panel by one of its sides and the element for holding threaded onto the top rib 11 makes it possible to hold the panel on the other of its sides.

Also, generally, the elements for holding can be those described in the fastening device of document WO2013/153329A, which is incorporated by reference. Such elements advantageously make it possible to hold the two photovoltaic panel P only by its two sides, and allows for a mounting of the photovoltaic panel, overhanging with respect to the support device 1.

According to the embodiment in FIG. 5, the structure 2 results from the assembly of several elements 22, 23, 24, 25, 26, 27 in particular by the intermediary of their lugs 32 and locking members 34 such as bolts.

Some of the elements can have ribs for the setting in place of elements for holding the device of the document WO2013/153329A. For example, the element 26 has at least one rib 12, for the setting of an element for holding intended to hold a side of a panel. Another element 27, opposite, has a rib 12 for the setting up of an element for holding intended to hold the other side of the panel.

However, the elements for holding can take other forms known by those skilled in the art. Those skilled in the art can as such use other fastening devices known for the elements for holding, and in particular clamping systems, fastening systems with screws, snap-fit systems, cam systems or any other fastening system known to those skilled in the art. It is however, preferably, a fastening system of the removable type, and in order to allow for the removal of the photovoltaic panel for maintenance operations. According to an advantageous embodiment, said elements for holding are arranged in such a way as to allow for the mounting the photovoltaic panel P overhanging laterally on the two sides of said device 1.

The invention also relates to a piece of equipment for the carrying out a photovoltaic installation comprising a plurality of modular support devices 1 for a panel in accordance with the invention.

The modular support devices 1 for a panel of the equipment are intended to be assembled together in order to form a network R of floating devices 1, 7 (or 1, 7'), either directly by their coupling elements (see FIGS. 7, 8 or FIGS. 20 and 21), or indirectly by the intermediary of their coupling elements and of connection elements 7 or 7'.

Figure 20:
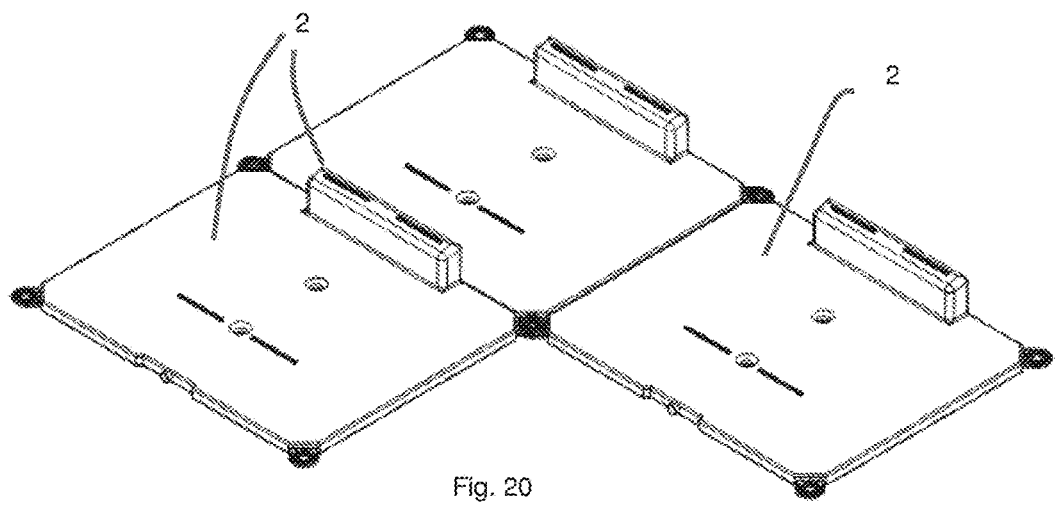
Figure 21:
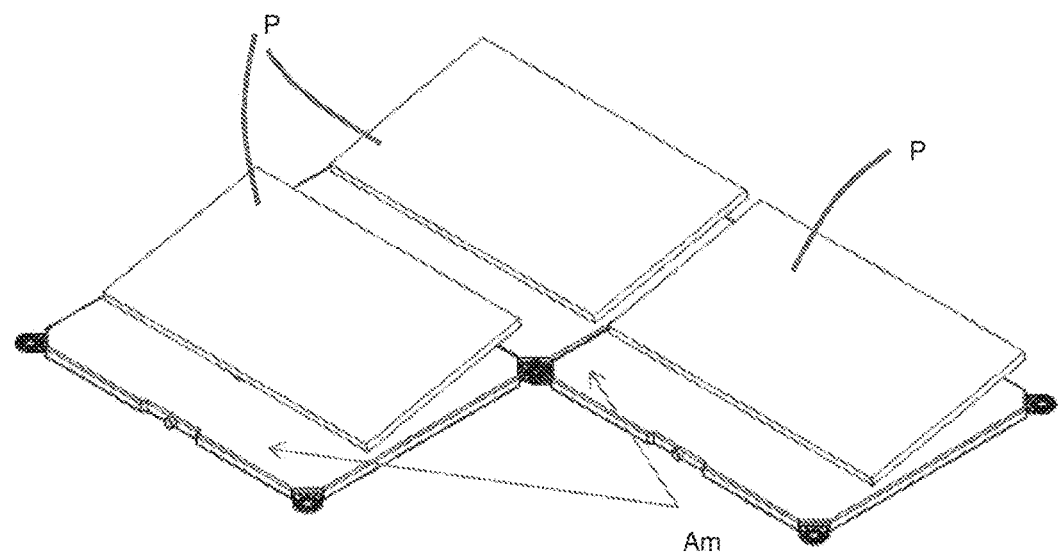

The devices 1, 7 (or 1, 7') of the network extend according to two directions of the body of water. According to an embodiment, and such as shown in FIGS. 20 and 21 (floats not shown), the structures 2 of said devices can be of overabundant dimension with respect to the dimensions of the photovoltaic panels P borne by the structures 2. The overabundant portions of the structures 2 of the network form as such and such as shown as a non-limiting example in FIG. 21 an alley for maintenance for the operators. In particular the structures 2 are configured in such a way that the overabundant portions of the structures 2 belonging to the same row of support devices of the network form an alley for maintenance for the operators. Such an embodiment has a particular application when the support devices 1 are assembled directly between them by their coupling elements 3.

According to an embodiment, the equipment as such comprises modular, and preferable floating, connection elements 7.

For example each connection element can have the form of a plastic envelope. This envelope encloses an interior volume making it possible to ensure that said connection element does float. This plastic envelope of said connection element can have a lower wall, an upper wall and four lateral walls. The sealed envelope of said connection element 7 can have an opening, closed by a plug. The semi-rigid plastic envelope of said connection element 7 can be obtained by blowing-extrusion, rotomoulding.

Alternatively and according to an embodiment shown in FIG. 6, each connection element 7' comprises:
a structure 70 comprising said coupling elements 3 for coupling to the floating devices 1 in such a way as to allow for the formation of a network R of floating devices,
one or several floats 71, intended to ensure that the device floats, rigidly connected to said structure 70.

Said structure 70 is advantageously an element separate from said float or floats 71 in such a way as to allow for the transmission of forces between the floating devices 1, 7' of the network R without transmitting the forces of the network to said float or floats 71.

The structure 70 can be an element preferably made of plastic and preferably of a single piece. This structure can be manufactured by moulding, rotomoulding, blowing extrusion or other methods for transforming plastic. As this structure has to withstand the forces of the network, the thickness of the wall can be greater than or equal to 3 mm and more preferably greater than or equal to 10 mm at least on the coupling elements 3. In order to limiter the consumption of material, said structure can be a hollow body, for example such as shown in a non-limited manner in FIG. 6. Alternatively or additionally, the plastic element can be a perforated body, for example latticed. Alternatively, the structure 70 can result from the assembly of several elements (not shown), in particular by a screwing system, a strap system or a snap-fit system.

According to an embodiment, said coupling elements 3 can be protruding lugs 32.

The or each one of the floats 71 of said connection element 7' can be a semi-rigid plastic envelope, or be an inflatable element.

The equipment has, furthermore, coupling elements 3 distributed between said connection elements 7 and said support devices 1 allowing for the assembly between them of said connection elements 7 and of said support devices 1.

For example, the coupling elements 3 are protruding lugs 32 of the devices 1 and protruding lugs 32 of the connection elements. Said equipment comprises locking members 34 (bolts), with each member being intended to pass through several lugs placed facing in order to ensure the locking of the assembly. The lugs 32 are provided preferably with four corners of said connection element 7 or 7'.

Possibly, elastomer stamps can be sandwiched between the lugs passed through by the same locking member 34.

The system resulting from the assembly of the modular elements of the equipment can have at least two rows R1, R2 of support devices 1 in accordance with the invention, said two rows being possible held by means of a row R3 of inserted connection elements 7. This row R3 of connection elements possibly makes it possible to constitute a maintenance corridor, continuously or discontinuously.

The floating connection elements 7 (or 7') can be placed end-to-end forming as such a continuous maintenance corridor, whereon an operator can move about. The upper surface of the connection elements 7 (or 7'), intended to receive footsteps can be corrugated or embossed or have another relief that favours gripping. Alternatively, the connection elements 7 (or 7') of the row R3 can be spaced for one another, for example in order to form a discontinuous maintenance corridor.

According to an embodiment shown in FIG. 1, two consecutive support devices 1 belonging to the same row R1 can be separated mutually by means of a connection element 7, even two connection elements 7 in parallel, bracing said consecutive devices 1.

To this effect, for example, a connection element has a coupling element fixed to a coupling element of a support device of the row R1 and a coupling element fixed to a coupling element of the consecutive support device, on the same row R1.

The free space, between the two consecutive support devices 1, authorises the mounting of the photovoltaic panel P in an overhanging manner, such as described hereinabove, according to the direction of the row R1.

Alternatively or additionally, and in the same objective, two consecutive support devices 1 belonging to the same row R4 can be separated by means of a support device 1, from a row of adjacent support devices R5, bracing said consecutive devices 1.

FIG. 1 shows, according to a non-limiting embodiment, two consecutive support devices 1 of the row R1 separated using two connection elements 7, bracing the support devices 1.

FIG. 7 shows, according to another non-limiting embodiment, two consecutive support devices 1 of the same row separated using two support devices 1 from two adjacent rows.

FIG. 9 shows, according to another non-limiting embodiment two consecutive support devices 1 of a same row separated using a connection element and of a support device, each bracing the two consecutive devices.

According to the example in FIGS. 7 and 8, the support devices 1 are assembled directly by their coupling elements (i.e. their lugs), as an example according to a chequered configuration.

The panels of the same row of support devices are preferably parallel, having the same inclination with respect to the surface of the water. The panels of the adjacent row of devices can be parallel with the same inclination, or oriented according to an opposite angle of inclination, according to FIG. 8.

Preferably, the coupling elements 3 of the support devices 1 and of the connection elements are configured to authorise, on the one hand, an assembly of the connection element as correspondence of the support device, and on the other hand, an assembly of the connection element bracing two support devices.

For an assembly as correspondence; two coupling elements in particular two lugs of the support device are assembled respectively with two coupling elements, in particular two lugs of said connection element 7.

For an assembly as bracing, one of the coupling elements of the connection element 7 is assembled to a coupling element of a first device 1 and another coupling element of said connection element 7 is assembled to a coupling element of a second support device 1. Possibly, these two types of assembly can be combined, such as shown in FIG. 1.

Generally, said structure 2 and the floats 4 and possibly the elements 60, 61 allowing for the inclination of the panel are made of plastic material, as well as said connection elements 7.

These various elements are intended to be rapidly assembled on site, such as a construction set and preferably, without tools. These elements are preferably easy to remove, in such a way as, during maintenance, to be able change only the damaged element, rapidly.

Naturally, other embodiments could have been considered by those skilled in the art without however leaving the scope of the invention as defined hereinafter.

NOMENCLATURE

1. Floating support device for a panel,
2. Structure for transmitting forces of the network,
20. Hollow body (Structure),
21. Perforated body, in particular added (Structure),
22, 23, 24, 25, 26 Elements (Structure),
3. Coupling elements,
30. Coupling elements (Device 1),
31. Coupling elements (Connection element 7),
32. Lugs,
34. Locking members,
4. Float,
40. Sealed semi-open body (as a frustum pyramid according to FIGS. 15 to 19)
41. Upper wall,
42 to 45. Lateral walls of a pyramid with four sides,
5. Screwing system,
60, 61. Elements for inclining the two photovoltaic panel,
7. Connection elements (of a single piece),
7' Connection element (in several parts),
70. Structure for transmitting forces of the network (Element 7'),
71 Float (Element 7'),
10. Fastening rib (bottom),
11. Fastening rib (top),
12. Fastening ribs,
Am. Alley for maintenance,
P. Photovoltaic panel,
R. Network of floating devices,
R1, R2; R4, R5. Rows of support devices for panels,
R3. Inserted row of connection elements.

The invention claimed is:

1. A floating support device (1) for a photovoltaic panel (P), comprising:
   a structure (2) comprising coupling elements (3) for coupling to other floating support devices in such a way as to allow a network (R) of floating support devices to be formed,
   one or a plurality of floats (4), intended to ensure that the floating support device does float, which are rigidly connected to said structure (2),
   elements for holding at least one photovoltaic panel (P),
   wherein said structure (2) is an element separate from said float or floats (4) so as to allow forces to be transmitted between the floating devices (1, 7) of the network (R), without transmitting the forces from the network (R) to said float or floats (4), and
   wherein said float or each one of said floats (4) comprises a semi-open body (40) as a frustum pyramid or as a truncated cone, sealed, and rigidly connected to the structure (2) in such a way as to form a pocket opened downwards, trapping a volume of air.

2. The device according to claim 1, wherein said structure (2) is a plastic element of a single piece.

3. The device according to claim 1, wherein said structure (2) results from the assembly of several elements (22, 23, 24, 25, 26) in a removable manner.

4. The device according to claim 3, wherein said elements (22, 23, 24, 25, 26) are assembled by a screwing system, a strap system, or a snap-fit system.

5. The device according to claim 1, wherein said coupling elements (3) comprise protruding lugs (32).

6. The device according to claim 1, wherein the structure (2) is provided as overhanging, laterally, with respect to said float or floats (4) and continuously over the periphery of said float or said floats.

7. The device according to claim 1, wherein the structure (2) and the float or floats are rigidly connected together by a screwing system (5), a strap system, or a snap-fit system.

8. The device according to claim 1, wherein said elements for holding are arranged in such a way as to allow for the mounting of the photovoltaic panel overhanging laterally the two sides of said floating support device (1).

9. Equipment for the carrying out of a photovoltaic installation comprising a plurality of said floating support devices (1) for a photovoltaic panel (P) according to claim 1, able to be assembled in order to form a network (R) of floating support devices.

10. Equipment comprising:
a plurality of modular floating support devices (1) for a photovoltaic panel(P), able to be assembled in order to form a network (R) of floating support devices, each of said modular floating support devices (1) comprising:
a structure (2) comprising coupling elements (3) for coupling to other floating support devices in such a way as to allow a network (R) of floating support devices to be formed,
one or a plurality of floats (4), intended to ensure that the floating support device does float, which are rigidly connected to said structure (2),
elements for holding at least one photovoltaic panel (P), and
wherein said structure (2) is an element separate from said float or floats (4) so as to allow forces to be transmitted between the floating devices (1, 7) of the network (R), without transmitting the forces from the network (R) to said float or floats (4);
modular floating connection elements (7; 7'); and
coupling elements (3) distributed between said modular floating connection elements (7; 7') and said floating support devices (1) allowing for the assembly between them of said modular floating connection elements (7; 7') and of said floating support devices (1).

11. The equipment according to claim 10, wherein each modular floating connection element (7; 7') is a plastic envelope that has an interior volume to ensure that said modular floating connection element (7; 7') does float, said envelope having said coupling elements (3).

12. The equipment according to claim 10, wherein each connection element (7; 7')comprises:
a structure (70) comprising said coupling elements (3) for coupling to floating support devices (1) in such a way as to allow the formation of a network (R) of floating support devices (1),
one or several floats (71), intended to ensure that the floating support devices (1) do float, which are rigidly connected to said structure (70), and
wherein said structure (70) is an element separate from the float or floats (71) in such a way as to allow for the transmission of forces between floating devices (1) of the network (R), without transmitting the forces of the network to said float or floats (71).

13. The equipment according to claim 10, wherein the coupling elements (3) are protruding lugs, said equipment comprising locking members, intended to pass through several lugs placed facing in order to ensure the locking of the assembly.

14. The equipment according to claim 10, wherein said structure (2) of each of said floating support devices (1) is a plastic element of a single piece.

15. The equipment according to claim 10, wherein said structure (2) of each of said floating support devices (1) results from the assembly of several elements (22, 23, 24, 25, 26), in a removable manner.

16. The equipment according to claim 15, wherein said elements (22, 23, 24, 25, 26) are assembled by a screwing system, a strap system, or a snap-fit system.

17. The equipment according to claim 10, wherein the structure (2) of said floating support device (1) is provided as overhanging, laterally, with respect to said float or floats (4) and continuously over the periphery of said float or said floats (4).

18. The equipment according to claim 10, wherein the structure (2) of said floating support device (1) and the float or floats (4) are rigidly connected together by a screwing system (5), a strap system, or a snap-fit system.

19. The equipment according to claim 10, further comprising one or several support elements (60, 61) in order to incline said at least one photovoltaic panel (P) with respect to the surface of the water.

20. The equipment according to claim 10, wherein said elements for holding are arranged in such a way as to allow for the mounting of the photovoltaic panel (P) overhanging laterally the two sides of said floating support device (1).

21. The equipment according to claim 10, wherein the float or each one of the floats (4) of said floating support device (1) is constituted by a plastic envelope, enclosing a volume of air.

22. The equipment according to claim 10, wherein the float or each one of the floats of said floating support device (1) is an inflatable element.

23. The equipment according to claim 10, wherein the float or floats (4) are rigidly connected to the structure (2), of said floating support device (1) bearing on the under-face of said structure (2).

24. A system resulting from the assembly of floating support devices for equipment according to claim 10, by inserted coupling elements (7, 7'), obtaining a network of floating support devices.

25. The system according to claim 24, having at least two rows (R1, R2) of floating support devices, said two rows being maintained by means of a row (R3) of said inserted connection elements (7).

26. The system according to claim 25, wherein two consecutive floating support devices (1) belonging to the same row (R1) are separated mutually by means of a connection element (7), bracing said consecutive floating support devices (1).

27. A system resulting from the assembly of floating support devices of an equipment for the carrying out of a photovoltaic installation, said equipment comprising a plurality of modular floating support devices (1) for a panel able to be assembled in order to form a network of floating support devices, directly by the intermediary of their coupling elements, or indirectly by the intermediary of inserted connection elements (7) obtaining a network of floating support devices, each of said modular floating support devices (1) comprising:
- a structure (2) comprising coupling elements (3) for coupling to other floating support devices in such a way as to allow a network (R) of floating support devices to be formed,
- one or a plurality of floats (4), intended to ensure that the floating support device does float, which are rigidly connected to said structure (2), and
- elements for holding at least one photovoltaic panel (P), and in which said structure (2) is an element separate from said float or floats (4) so as to allow forces to be transmitted between the floating support devices (1) of the network (R), without transmitting the forces from the network to said float or floats (4), and
- wherein the system has at least two rows (R1, R2) of floating support devices, said two rows being maintained by means of a row (R3) of said inserted connection elements (7).

28. The system according to claim 27, wherein two consecutive floating support devices (1) belonging to the same row (R1) are separated mutually by means of a connection element (7), bracing said consecutive floating support devices (1).

29. The system according to claim 27, wherein each connection element (7) is in the form of a plastic envelope that has an interior volume making it possible to ensure that said connection element does float (7), said envelope having said coupling elements (3).

30. The system according to claim 27, wherein each connection element (7) comprises:
- a structure (70) comprising said coupling elements (3) for coupling to floating support devices (1) in such a way as to allow the formation of a network (R) of floating support devices,
- one or several floats (71), intended to ensure that the floating support devices do float, which are rigidly connected to said structure (70), and
- wherein said structure (70) is an element separate from the float or floats (71) in such a way as to allow for the transmission of forces between floating support devices (1) of the network (R), without transmitting the forces of the network to said float or floats (71).

31. The system according to claim 27, wherein the coupling elements (3) are protruding lugs, said equipment comprising locking members, intended to pass through several lugs placed facing in order to ensure the locking of the assembly.

32. The system according to claim 27, wherein said structure (2) of each of said floating support devices (1) is a plastic element of a single piece.

33. The system according to claim 27, wherein said structure (2) of each of said floating support devices (1) results from the assembly of several elements (22, 23, 24, 25, 26), in a removable manner.

34. The system according to claim 33, wherein said elements (22, 23, 24, 25, 26) are assembled by a screwing system, a strap system, or a snap-fit system.

35. The system according to claim 27, wherein the structure (2) and the float or floats of each of said floating support devices (1) are rigidly connected together by a screwing system (5), a strap system, or a snap-fit system.

36. The system according to claim 27, wherein said elements for holding are arranged in such a way as to allow for the mounting of the photovoltaic panel overhanging laterally the two sides of each of said floating support devices (1).

37. The system according to claim 27, wherein the or each one of the floats (4) of each of said floating support devices (1) is constituted by a plastic envelope, enclosing a volume of air.

38. The system according to claim 27, wherein the float or floats (4) are rigidly connected to the structure (2), bearing on the under-face of said structure (2) of each of said floating support devices (1).

39. A system resulting from the assembly of floating support devices for equipment for the carrying out of a photovoltaic installation, said equipment comprising a plurality of modular floating support devices (1) for a panel able to be assembled in order to form a network of floating support devices, directly by coupling elements, or indirectly by inserted connection elements (7, 7'), obtaining a network of floating support devices, each of said modular floating support devices (1) comprising:
- a structure (2) comprising coupling elements (3) for coupling to other floating support devices in such a way as to allow a network (R) of floating devices to be formed,
- one or a plurality of floats (4), intended to ensure that the floating support device does float, which are rigidly connected to said structure (2), and
- elements for holding at least one photovoltaic panel (P), and in which said structure (2) is an element separate from said float or floats (4) so as to allow forces to be transmitted between the floating support devices (1) of the network (R), without transmitting the forces from the network to said float or floats (4), and
- wherein two consecutive floating support devices (1) belonging to the same row (R4) are separated by means of a device, belonging to an adjacent row (R5) of floating support devices, bracing said consecutive floating support devices (1).

40. The system according to claim 39, wherein the coupling elements (3) are protruding lugs, said equipment comprising locking members, intended to pass through several lugs placed facing in order to ensure the locking of the assembly.

41. The system according to claim 39, wherein said structure (2) is a plastic element of a single piece.

42. The system according to claim 39, wherein said structure (2) results from the assembly of several elements (22, 23, 24, 25, 26), in a removable manner.

43. The system according to claim 42, wherein said elements (22, 23, 24, 25, 26) are assembled by a screwing system, a strap system, or a snap-fit system.

44. The system according to claim 39, wherein the structure (2) and the float or floats are rigidly connected together by a screwing system (5), a strap system, or a snap-fit system.

45. The system according to claim 39, wherein said elements for holding are arranged in such a way as to allow for the mounting of the photovoltaic panel (P) overhanging laterally the two sides of each of said floating support devices (1).

46. The system according to claim 39, wherein the or each one of the floats (4) is constituted by a plastic envelope, enclosing a volume of air.

47. The system according to claim 39, wherein the float or floats (4) are rigidly connected to the structure (2), bearing on the under-face of said structure (2).

48. A system resulting from the assembly of floating support devices of an equipment for the carrying out of a photovoltaic installation, said equipment comprising a plurality of modular floating support devices (1) for a photovoltaic panel (P) able to be assembled in order to form a network of floating support devices, directly by coupling elements, or indirectly by inserted connection elements (7, 7'), obtaining a network of floating devices, each of said modular floating support devices (1) comprising:
- a structure (2) comprising coupling elements (3) for coupling to other floating support devices in such a way as to allow a network (R) of floating support devices to be formed,
- one float or a plurality of floats (4), intended to ensure that the device does float, which are rigidly connected to said structure (2),
- elements for holding at least one photovoltaic panel (P), and
- wherein said structure (2) is an element separate from said float or floats (4) so as to allow forces to be transmitted between the floating support devices (1) of the network (R), without transmitting the forces from the network to said float or floats (4), and
- wherein the structures (2) of said floating support devices (1) are of overabundant dimension with respect to the dimensions of the photovoltaic panels (P) borne by the structures (2), configured in such a way that the overabundant portions of the structures (2) belonging to the same row of floating support devices of the network (R) form an alley for maintenance (Am) for operators.

* * * * *